United States Patent [19]
Ichimura et al.

[11] Patent Number: 5,351,542
[45] Date of Patent: Oct. 4, 1994

[54] ACCELERATION SENSOR ASSEMBLY

[75] Inventors: Etsuo Ichimura; Masaru Goto, both of Saitama Prefecture, Japan

[73] Assignee: Kansei Corporation, Omiya City, Japan

[21] Appl. No.: 826,950

[22] Filed: Jan. 27, 1992

[51] Int. Cl.⁵ .............................................. G01P 15/09
[52] U.S. Cl. ................... 73/517 R; 73/516 R; 338/2
[58] Field of Search ............. 73/517 R, 516 R; 338/2, 338/5

[56] References Cited

U.S. PATENT DOCUMENTS

| | | | |
|---|---|---|---|
| 4,430,895 | 2/1984 | Colton | 73/517 R |
| 4,829,822 | 5/1989 | Imai et al. | 73/517 R |
| 4,869,107 | 9/1989 | Murakami | 73/517 R |
| 4,967,598 | 11/1990 | Wakatsuki et al. | 73/517 R |
| 5,095,751 | 3/1992 | Wada et al. | 73/517 R |

FOREIGN PATENT DOCUMENTS

DE3918407 12/1990 Fed. Rep. of Germany.
DE4022464 1/1992 Fed. Rep. of Germany.

*Primary Examiner*—Hezron E. Williams
*Assistant Examiner*—Helen C. Kwok
*Attorney, Agent, or Firm*—Foley & Lardner

[57] ABSTRACT

An acceleration sensor assembly is shown, which comprises a base board; a ceramic plate bonded to the base board, the ceramic plate having predetermined circuits printed thereon; an operational amplifier in the shape of Silicon-chip, the amplifier being mounted on the ceramic plate; an acceleration sensor proper mounted on the ceramic plate, the sensor proper being of a piezoresistance semiconductor type; a first group of bonding wires through which the operational amplifier and the circuits are connected; and a second group of bonding wires through which the acceleration sensor proper and the circuits are connected. In order to facilitate the bonding connection of the bonding wires to their associated parts, the bonding wires of the first and second groups are identical in diameter.

7 Claims, 3 Drawing Sheets

ACCELERATION SENSOR ASSEMBLY

BACKGROUND OF THE INVENTION

1. Field of the Invention

The present invention relates to acceleration sensor assemblies used in motor vehicles, and more particularly to acceleration sensor assemblies of a type which controls air bags, electronically controlled suspensions and the like.

2. Description of the Prior Art

In order to clarify the task of the present invention, one conventional acceleration sensor assembly of the above-mentioned type will be described with reference to FIG. 6 of the accompanying drawings.

In the drawing, denoted by numeral 1 is a base board of stainless steel. A ceramic plate 3 on which predetermined circuits 2 are printed is tightly disposed through a suitable adhesive. On the ceramic plate 3, there are mounted an operational amplifier (Silicon-chip) 4 and resistors 5. Designated by numeral 6 is a piezoelectric type cantilever sensor proper which is disposed on the base board 1. The sensor proper 6 comprises a cantilever 61 which has a piezoelectric ceramic plate (not shown) connected thereto and a hermetically sealed casing 62 which contains the cantilever 61. Within the casing 62, there is filled a damping material such as a silicon gel. Designated by numerals 7 are terminal eyes which are stationarily held in openings 8 formed in the base board 1. For the holding of the terminal eyes 7, a suitable hermetically sealing agent 9 is applied to each opening 8.

Terminals of the operational amplifier 4 and the circuits 2 are connected through bonding wires 10 by means of a known wire bonding technique. Terminals of the sensor proper 6 and the circuits 2 are connected through bonding wires 11 by means of the wire bonding technique. Terminals 12 arranged on the ceramic plate 3 and the terminal eyes 7 are connected through bonding wires 13 by means of the same bonding technique.

However, due to its inherent construction, the above-mentioned conventional sensor assembly has the following drawbacks.

Since the terminals of the operational amplifier 4 are small in size and densely arranged, usage of thicker bonding wires as the wires 10 is substantially impossible. That is, the connection between the circuits 2 and the operational amplifier 4 has to be made by using relatively thinner bonding wires 10. Furthermore, because the sensor proper 6 is positioned at a distance from the circuits 2 on the ceramic plate 3, it is necessary to use relatively long bonding wires as the wires 11. This induces the need of using durable and thus relatively thicker bonding wires as the wires 11. Furthermore, since the bonding wires 13 between the terminals 12 of the ceramic plate 3 and the terminal eyes 7 have to bear against a relatively high current, the wires 13 must have each a relatively large cross section.

As is understood from the above, in this conventional acceleration sensor assembly, it is necessary to use bonding wires of different sizes as the wires 10, 11 and 12. However, bonding of such different-sized bonding wires to the desired terminal parts tends to make the bonding operation very troublesome and time-consuming. That is, the bonding of different-sized wires must be made by using several bonding machines, each machine being set to handle only one type of the bonding wires 10, 11 or 12.

Furthermore, the step for filling the casing 62 with the damping material lowers the productivity of the sensor proper 6 and thus causes increase in production cost. Furthermore, because of presence of the damping material, the size of the sensor proper 6 becomes increased and thus the entire of the sensor assembly becomes bulky in construction.

SUMMARY OF THE INVENTION

It is therefore an object of the present invention to provide an acceleration sensor assembly which is free of the above-mentioned drawbacks.

According to the present invention, there is provided an acceleration sensor assembly which comprises a base board; a ceramic plate bonded to the base plate, the ceramic plate having predetermined circuits printed thereon; an operational amplifier in the shape of Silicon-chip, the amplifier being mounted on the ceramic plate; an acceleration sensor proper mounted on the ceramic plate, the sensor proper being of a piezoresistance semiconductor type; a first group of bonding wires through which the operational amplifier and the circuits are connected; and a second group of bonding wires through which the acceleration sensor proper and the circuits are connected, wherein the bonding wires of the first and second groups are identical in diameter.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
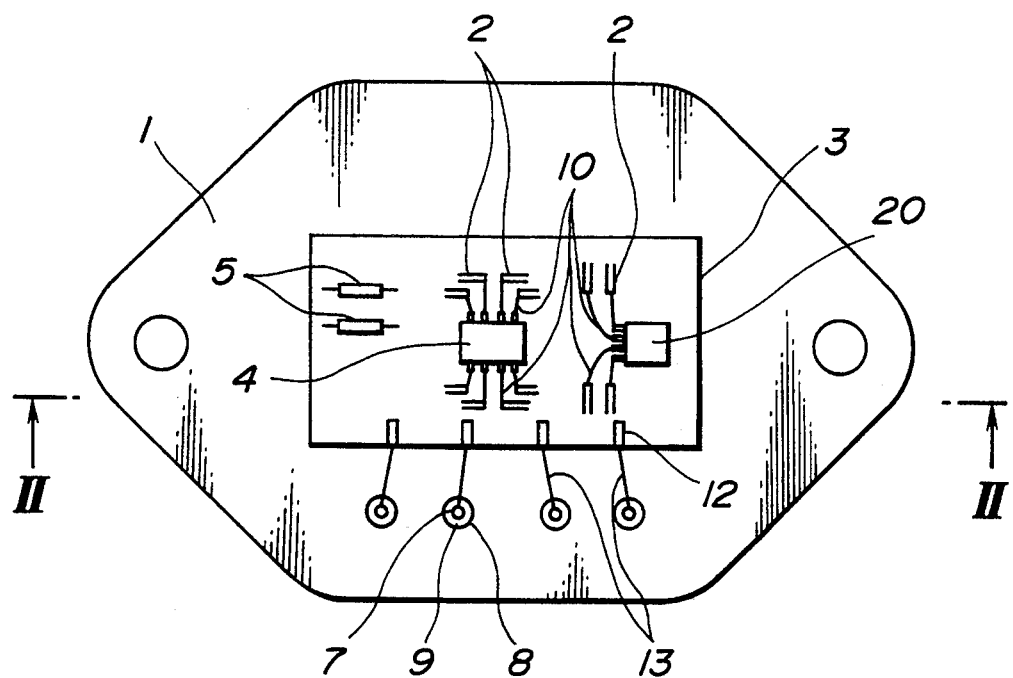
FIG. 1 is a plan view of an acceleration sensor assembly according to the present invention.
Figure 2:
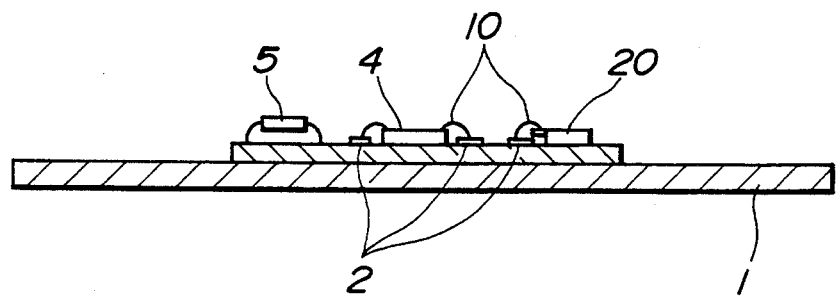
FIG. 2 is a sectional view taken along the line II—II of FIG. 1.

Referring to FIGS. 1 to 5, particularly FIG. 1, there is shown an acceleration sensor assembly according to the present invention.

In the drawing, substantially same parts as those of the above-mentioned conventional sensor assembly are denoted by the same numerals and detailed explanation of such same parts will be omitted from the following description.

In FIG. 1, denoted by numeral 1 is a base board of stainless steel onto which a ceramic plate 3 is bonded. The ceramic plate 3 has predetermined circuits 2 printed thereon. An operational amplifier 4 in the shape of Silicon-chip and resistors 5 are mounted on the ceramic plate 3. Terminal eyes 7 and terminals 12 are arranged respectively on the base board 1 and the ceramic plate 3 in the same manner as those of the above-mentioned conventional sensor assembly.

In accordance with the present invention, an acceleration sensor proper 20 is mounted on the ceramic plate 3, not on the base board 1. As shown, the sensor proper 20 is formed like a chip using piezoresistance semiconductors.

Figure 3:
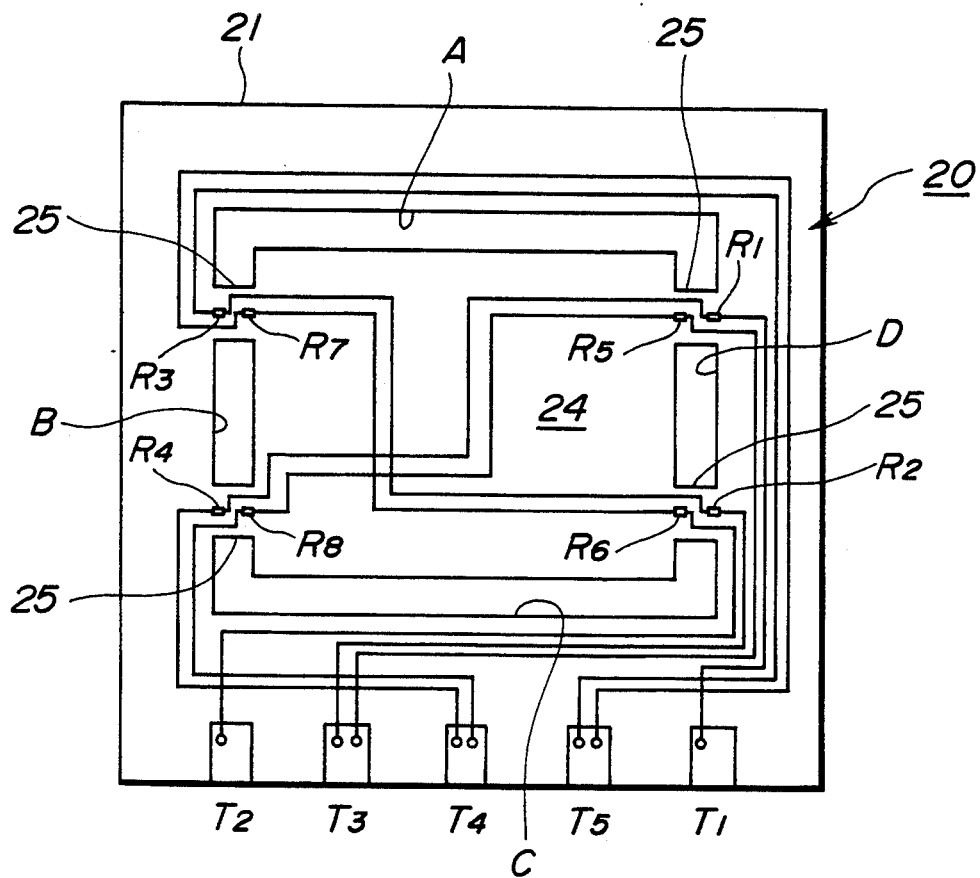
FIG. 3 is an enlarged plan view of a sensor proper mounted on the sensor assembly of the invention.
Figure 4:
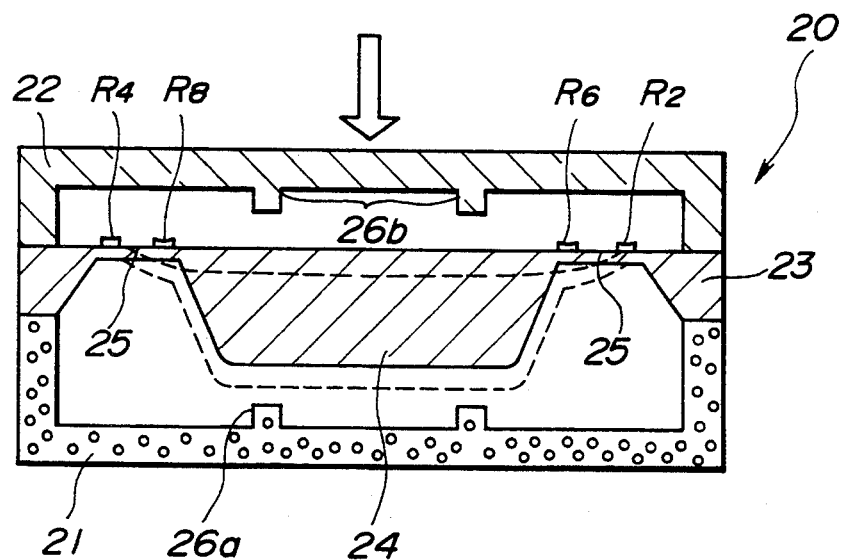
FIG. 4 is a sectional view of the sensor proper of FIG. 3.
Figure 5:
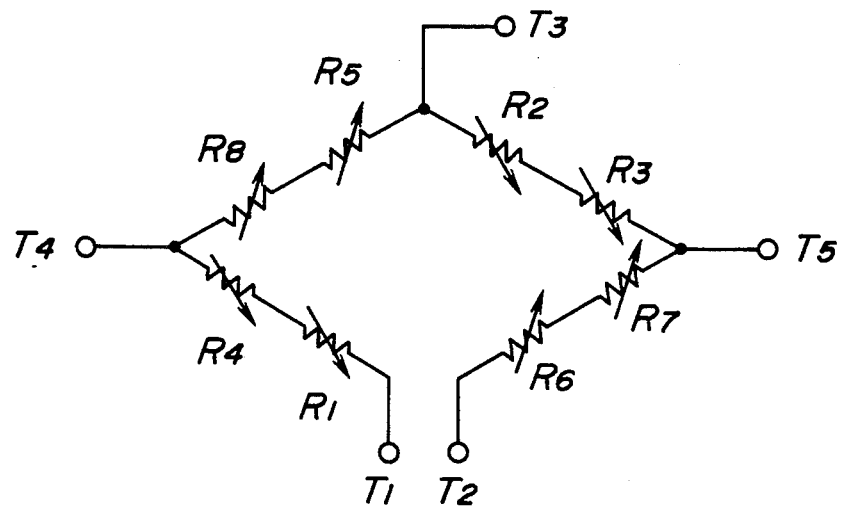
FIG. 5 is an electric circuit of the sensor proper.

FIGS. 3, 4 and 5 show the detail of the sensor proper 20.

The sensor proper 20 comprises a rectangular lower case 21 and a rectangular upper case 22 which are united together to constitute a housing. The housing has a rectangular silicon plate member 23 interposed between the upper and lower cases 22 and 21.

As is understood from FIG. 3, the rectangular plate member 23 generally comprises a rectangular frame portion (no numeral) and a rectangular center portion 24 which are bounded by four rectangularly arranged slits A, B, C and D formed through the plate member 23.

As is seen from FIG. 4, the rectangular center portion 24 is shaped thicker than the frame portion and integrally connected to the frame portion through four thinner beam portions 25.

The center portion 24 thus serves as a weight which has a certain inertial mass. That is, upon application of a certain acceleration or deceleration thereto, the center portion 24 is forced to move downward or upward relative to the frame portion.

As shown in FIG. 4, the lower and upper cases 21 and 22 have inward projections 26a and 26b which stop or suppress an excessive vertical movement of the center portion 24 relative to the frame portion.

On each beam portion 25, there are mounted two piezoelectric resistors R1 and R2 (or, R3 and R4, R5 and R6, R7 and R8) of P-type semiconductor. These piezoelectric resistors R1 to R8 are connected to constitute such a bridge circuit as shown in FIG. 5, which circuit has first, second, third, fourth and fifth terminals T1, T2, T3, T4 and T5. That is, the connection between the piezoelectric resistors R1 to R8 is made through bonding wires in such a manner as shown in FIG. 3.

Referring back to FIG. 1, the wiring between the operational amplifier 4 and the circuits 2 and that between the sensor proper 20 and the circuits 2 are made through identical shorter and thinner bonding wires 10. More specifically, these two wirings are made by bonding wires which are identical in diameter.

Preferably, the bonding wires 10 are gold wires of about 30μ to about 35μ in diameter or aluminum wires of about 150μ in diameter.

When, in FIG. 4, the center portion 24 is applied with an acceleration in the direction of the arrow, the center portion 24 is displaced to the position as indicated by a broken line. With this displacement, the beam portions 25 of the rectangular plate member 23 are deformed thereby changing the resistance values of the piezoelectric resistors R1 to R8. As a result, there is produced in the bridge circuit a potential deference in accordance with the displacement of the center portion 24, and thus the acceleration sensor proper 20 generates an output which differs in accordance with the degree of the acceleration.

In the following, advantages of the present invention will be described.

Figure 6:
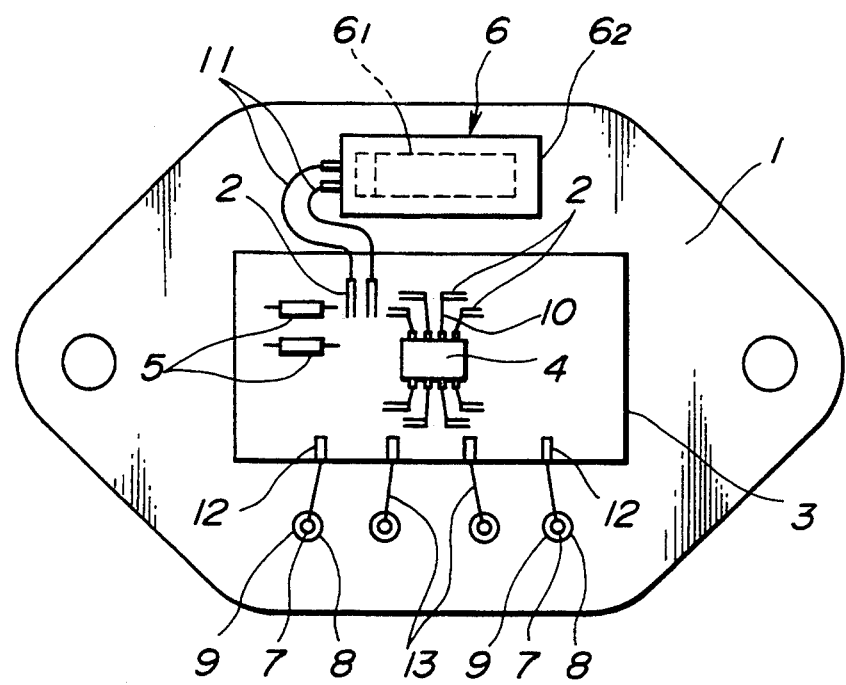
FIG. 6 is a view similar to FIG. 1, but showing a conventional acceleration sensor assembly.

Since the acceleration sensor proper 20 used in the invention is compact in size, the same can be mounted on the ceramic plate 3 without running a risk of breakage of the plate 3. Thus, as is seen from FIGS. 1 and 2, the wiring between the sensor proper 20 and the circuits 2 and that between the operational amplifier 4 and the circuits 2 can be made by bonding wires 10 of identical shorter and thinner type unlike in the case of the aforementioned conventional sensor assembly of FIG. 6. Accordingly, the bonding for such wires 10 can be easily carried out. That is, the wire bonding between the above-mentioned two wirings is achieved by using a single bonding machine. Thus, productivity of the acceleration sensor assembly is increased.

Furthermore, because of usage of the compact sensor proper 20, the acceleration sensor proper of the invention can be made compact in size and thus same is widely applicable to various industrial fields.

What is claimed is:

1. An acceleration sensor assembly comprising:
 a base board;
 a ceramic plate bonded to said base board and having predetermined circuits printed thereon;
 a silicon-chip operational amplifier mounted on said ceramic plate;
 a piezoresistance semiconductor acceleration sensor mounted on said ceramic plate;
 a first group of bonding wires through which said operational amplifier and said circuits are electrically connected; and
 a second group of bonding wires through which said acceleration sensor and said circuits are electrically connected,
 wherein said acceleration sensor includes lower and upper cases united to constitute a housing; an apertured silicon plate member installed in said housing and having a frame portion, a center weight portion, and thinner beam portions through which said frame portion and said center weight portion are integrally connected, said center weight portion being displaceable relative to said frame portion causing deformation of said thinner beam portions upon application of a specific acceleration to said center weight portion; piezoelectric resistors mounted on said thinner beam portions; wires connecting said piezoelectric resistors to constitute a bridge circuit; and a plurality of terminals connected to said wires and said second group of bonding wires, and
 wherein the bonding wires of said first and second groups are of the same type and are identical in diameter.

2. An acceleration sensor assembly as claimed in claim 1, in which said bonding wires of said first and second groups are bonded to respective terminals of said operational amplifier and said acceleration sensor.

3. An acceleration sensor assembly as claimed in claim 1, in which said wiring connecting said piezoelectric resistors is made by gold wires.

4. An acceleration sensor assembly as claimed in claim 3, in which said lower and upper cases have inwardly projected stopper portions by which excessive movement of said center weight portion is suppressed.

5. An acceleration sensor assembly as claimed in claim 4, in which said center weight portion is shaped thicker than the remaining portion of said silicon plate member.

6. An acceleration sensor assembly as claimed in claim 1, in which the bridge circuit of said wires has five terminals.

7. An acceleration sensor assembly as claimed in claim 1, in which said bonding wires of said first and second groups are gold wires of about 30μ to about 35μ in diameter or aluminum wires of about 150μ in diameter.

* * * * *